Aug. 14, 1934.   A. F. MASURY   1,970,100
ENDLESS TRACK
Filed April 13, 1933   2 Sheets-Sheet 1
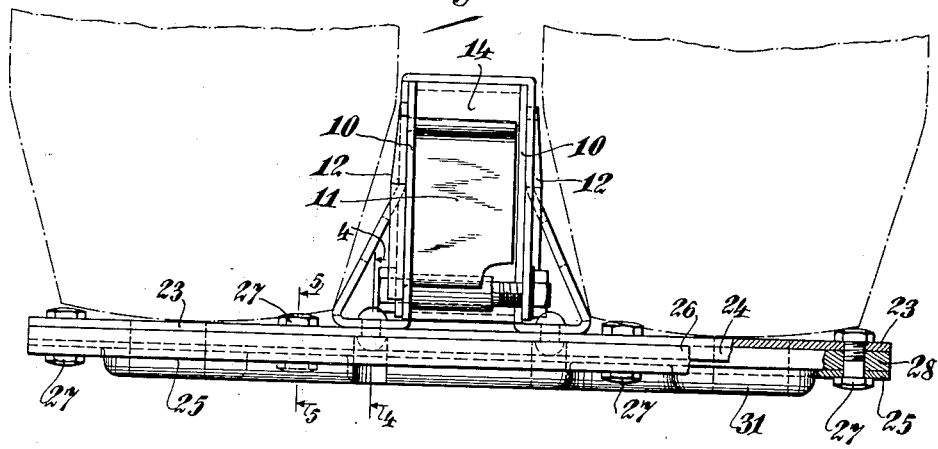
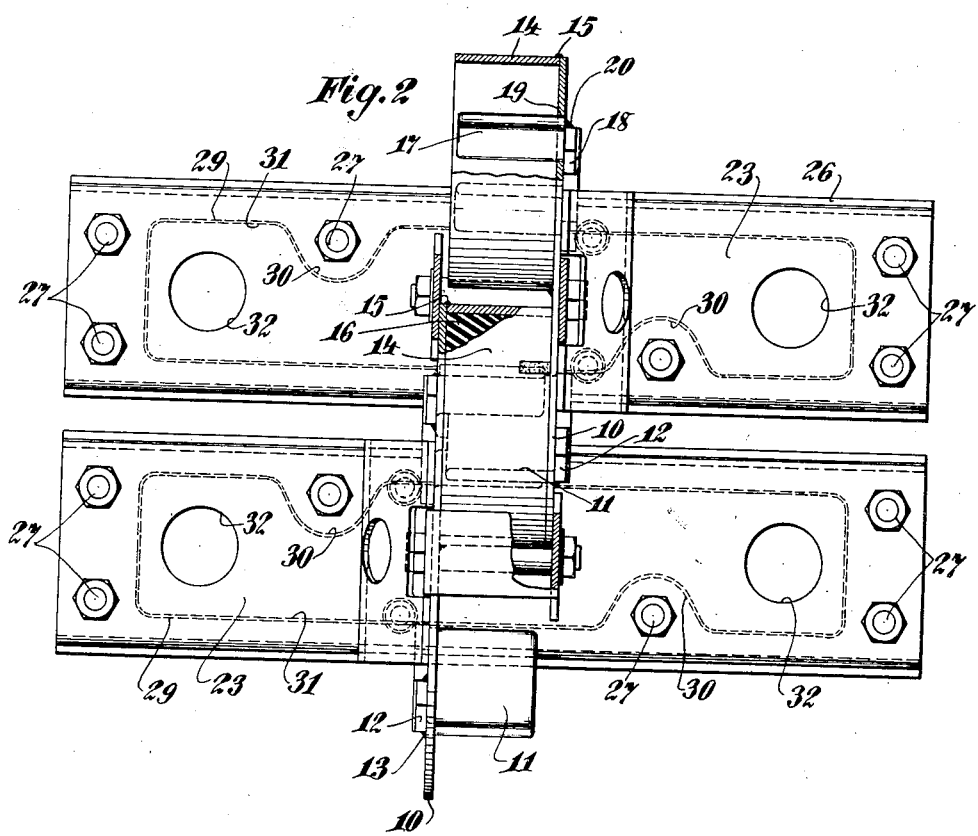
INVENTOR
*Alfred F. Masury,*
BY
Redding, Greeley, O'Shea & Campbell
HIS ATTORNEYS Aug. 14, 1934.    A. F. MASURY    1,970,100
ENDLESS TRACK
Filed April 13, 1933    2 Sheets-Sheet 2
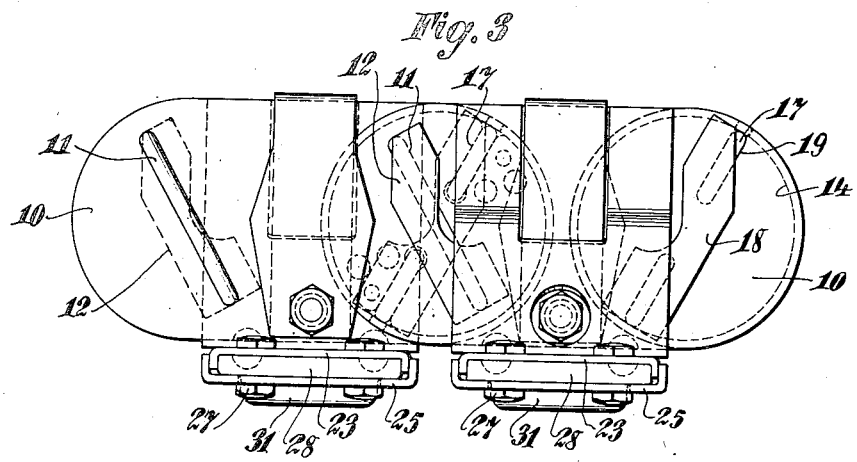
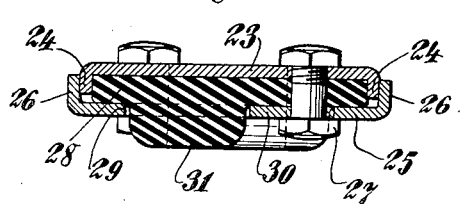
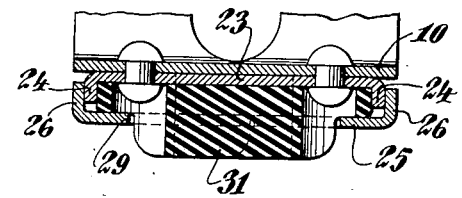
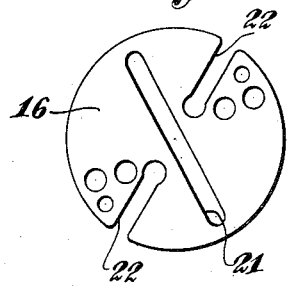
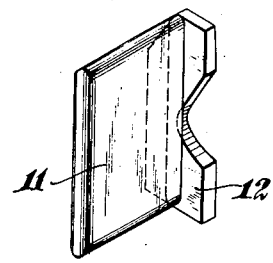
INVENTOR
*Alfred F. Masury,*
BY
Redding, Greeley, O'Shea & Campbell
HIS ATTORNEYS Patented Aug. 14, 1934

1,970,100

UNITED STATES PATENT OFFICE 1,970,100

ENDLESS TRACK

Alfred F. Masury, New York, N. Y., assignor to International Motor Company, New York, N. Y., a corporation of Delaware Application April 13, 1933, Serial No. 665,885

1 Claim. (Cl. 305—10)

The present invention relates to endless track constructions for motor vehicles and embodies, more specifically, an improved endless track construction wherein the track elements are provided with bearing pads of a highly serviceable and effective character.

In applicant's copending application Ser. No. 592,053, filed February 10, 1932, an endless track construction is shown wherein a plurality of track elements are hingedly connected through yielding non-metallic members which offer greater resistance to relative pivotal movement between the members in one direction than in another. The present invention embodies improved features over the construction covered in the above identified application, these features comprising a more effective hinge construction by means of which greater strength is imparted to the hinge elements between the respective track members.

The invention further includes an improved tread construction which is adapted to be mounted upon the track members in the above identified application, these tread members including rubber bearing pads which are effectively secured in an improved fashion.

Further objects, not specifically enumerated above, will be apparent as the invention is described in greater detail in connection with the accompanying drawings, wherein:

Figure 1 is a view in end elevation showing a track member provided with a hinge construction and tread structure constructed in accordance with the present invention.

Figure 2 is a plan view, partly broken away and in section, showing the elements of Figure 1.

Figure 3 is a view in side elevation, showing two connected track sections constructed in accordance with the present invention.

Figure 4 is a view in section, taken on line 4—4 of Figure 1, and looking in the direction of the arrows.

Figure 5 is a view in section, taken on line 5—5 of Figure 1, and looking in the direction of the arrows.

Figure 6 is a detail view showing the rubber hinging element of the track described herein.

Figure 7 is an end elevation of the rubber member shown in Figure 6.

Figure 8 is a perspective view showing the detailed construction of the improved hinge construction of the present invention.

Referring to Figures 1, 2, and 3, an endless track construction will be seen comprising a plurality of link plates 10 which are adapted to be hingedly connected in accordance with the structure described in applicant's copending application, above identified. These plates 10 are provided, at one end, with webs 11 which are preferably formed as a unit with backing plates 12, the link plates 10 being apertured and the webs 11 inserted therethrough in order that the backing plates may be welded to the link plates 10, as indicated at 13.

The other ends of the link plates 10 having cylindrical housings 14 secured thereto as by welding at 15 and each housing is adapted to receive a block of yielding non-metallic material 16. At the opposite end of the link plates 10 from the webs 11, cooperating webs 17 are provided. These webs are formed upon backing plates 18 and are inserted through apertures 19 formed in the plates 10, the backing plates 18 being welded to the backs of plates 10, as indicated at 20. The blocks of yielding non-metallic material 16 are formed with recesses 21 and 22 adapted to receive the webs 11 and 17, respectively. In this fashion, the link plates are hinged together yieldingly.

Each plate 10 has secured thereto a bottom plate 23, the sides of which are turned down to plate 23, the sides of which are turned down to form vertical flanges 24. Cooperating with each form vertical flanges 24. Cooperating with each bottom plate 23 is a tread plate 25, the sides of which are bent upwardly to form vertical flanges 26. The flanges 26 are so spaced that the flanges 24 may be telescopically received therebetween as shown in Figures 4 and 5. Bolts 27 pass through the plates 23 and 25 and secure them together, as shown in Figure 5.

Between the plates 23 and 25 pads of yielding non-metallic material 28 are received. The tread plates 25 are formed with apertures 29 and shouldered portions 30. The pads 28 are formed with thickened portions 31 which are shaped to conform to the apertures 29 of the plates 25 and to project therethrough as shown in Figures 4 and 5. The shoulders 30 form portions which overlie the pads 28 and receive the bolts 27 in order that the pads 28 may be effectively secured in position between the plates 23 and 25. Apertures 32 are preferably formed in the bottom plates 23 and pads 28, upon opposite sides of the plate 10 in order that a more effective bearing pad structure may be provided, having a self-scavaging action.

From the foregoing, it will be seen that an improved endless track structure has been provided having a tread construction which is of great strength and of yielding non-metallic nature. While the invention has been described with specific reference to the accompanying drawings, it is not to be limited, save as defined in the appended claim.

I claim as my invention:

An endless track member adapted to be hingedly connected with an adjacent track member through a block of yielding non-metallic material and formed with a plate having an aperture formed therein at one end thereof, a web member formed with a back portion, said web member passing through the aperture and adapted to engage a hinge block, the other end of the plate being formed with aligned apertures, web members formed with a common back portion and adapted to pass through the last named apertures to engage a hinge block, and the back portions of the web members being secured to the plate.

ALFRED F. MASURY.